United States Patent
Belanger et al.

(10) Patent No.: US 6,824,805 B2
(45) Date of Patent: Nov. 30, 2004

(54) FURFURYL PROPYL DISULFIDE AS A FLAVORING AGENT AND METHODS FOR PREPARING AND USING SAME

(75) Inventors: Ronald Louis Belanger, Yorktown Heights, NY (US); Benjamin Owen Isaac, Ilford (GB); Anne-Dominique Fortineau, London (GB)

(73) Assignee: Bush Boake Allen Ltd., Montvale, NJ (US)

( * ) Notice: Subject to any disclaimer, the term of this patent is extended or adjusted under 35 U.S.C. 154(b) by 469 days.

(21) Appl. No.: 10/039,427

(22) Filed: Jan. 4, 2002

(65) Prior Publication Data

US 2002/0110628 A1 Aug. 15, 2002

(51) Int. Cl.$^7$ ................................................. A23L 1/22
(52) U.S. Cl. ...................... 426/535; 426/533; 426/534; 426/650; 549/476; 549/479
(58) Field of Search ................................ 426/533, 534, 426/535, 650; 549/476, 479

(56) References Cited

U.S. PATENT DOCUMENTS

| | | | | |
|---|---|---|---|---|
| 3,803,172 A | * | 4/1974 | Van Der Waal | 549/32 |
| 3,917,869 A | * | 11/1975 | Evers et al. | 426/535 |
| 3,982,038 A | * | 9/1976 | Evers et al. | 426/535 |
| 3,985,907 A | * | 10/1976 | Evers et al. | 426/535 |
| 3,985,908 A | * | 10/1976 | Evers et al. | 426/535 |
| 3,993,792 A | * | 11/1976 | Winter et al. | 426/535 |
| 4,000,328 A | * | 12/1976 | Winter et al. | 426/535 |
| 4,007,287 A | * | 2/1977 | Evers et al. | 426/535 |
| 4,105,661 A | * | 8/1978 | Winter et al. | 544/405 |
| 4,514,429 A | * | 4/1985 | Pittet et al. | 426/535 |

* cited by examiner

*Primary Examiner*—Leslie Wong
(74) *Attorney, Agent, or Firm*—Richard R. Muccino

(57) ABSTRACT

This invention pertains to a method for flavoring an ingestible composition with a flavoring agent, furfuryl propyl disulfide, in organoleptically purified form, unaccompanied by substances of natural origin present in cooked beef and onions. The flavoring agent may be used in a wide variety of ingestible vehicles to augment or enhance the aroma or taste of foodstuffs, particularly roasted nut, roasted meat, beef broth, black pepper, onion, fine herbs, omelet, and cooked onion omelet flavored foodstuffs. The present invention also pertains to an ingestible composition comprising an ingestible vehicle and an organoleptically effective amount of the purified flavoring agent. The present invention also pertains to furfuryl propyl disulfide represented by the formula, (2-Furan-$CH_2SSCH_2CH_2CH_3$), in purified form, unaccompanied by substances of natural origin present in cooked beef and onions, and to methods for preparing furfuryl propyl disulfide.

12 Claims, No Drawings

FURFURYL PROPYL DISULFIDE AS A FLAVORING AGENT AND METHODS FOR PREPARING AND USING SAME

This application claims priority from United Kingdom patent application Ser. No. 0011211.0, filed May 9, 2000.

BACKGROUND OF THE INVENTION

1. Field of the Invention

This invention pertains to a method for flavoring an ingestible composition which comprises admixing an ingestible vehicle with an organoleptically effective amount of furfuryl propyl disulfide represented by the formula, (2-Furan-$CH_2SSCH_2CH_2CH_3$), in purified form, unaccompanied by substances of natural origin present in cooked beef and onions. The flavoring agent may be used in a wide variety of ingestible vehicles to augment or enhance the aroma or taste of foodstuffs, particularly roasted nut, roasted meat, beef broth, black pepper, onion, fine herbs, omelet, and cooked onion omelet flavored foodstuffs. The present invention also pertains to an ingestible composition comprising an ingestible vehicle and an organoleptically effective amount of the purified flavoring agent. The present invention also pertains to furfuryl propyl disulfide represented by the formula, (2-Furan-$CH_2SSCH_2CH_2CH_3$), in purified form, unaccompanied by substances of natural origin present in cooked beef and onions, and to methods for preparing furfuryl propyl disulfide.

2. Description of the Background

The Generessence® flavor research program conducted by Bush Boake Allen focuses on developing flavors by employing in depth understanding of the volatile organic components present in a wide variety of samples, for example fruits, herbs, and meat products and coupling this information to flavor preference profiling. A number of sampling and analytical techniques are used including extraction, distillation, and headspace analysis of the sample. The flavors are primarily formulated from synthetic chemicals and contain only components identified in the sample. There is no limit to the concentration of individual components used apart from organoleptic considerations. A problem with developing flavoring agents, such as cooked beef and onions flavor, is that natural flavoring agents do not contain a single flavoring agent, but rather contain a complex mixture of volatile components making identification of characteristic flavors very difficult.

U.S. Pat. No. 3,803,172 (Van Der Wal) discloses substituted tetrahydrofurfuryl and tetrahydrothienyl compounds having two mercapto substituents at the 3-position. Preferred tetrahydrofurfuryl and tetrahydrothienyl compounds include (2-methyl-3-mercapto-tetrahydrofuryl-3) (2'-methyl-4',4-dibydrofuryl-3') sulfide; (2-methyl-3-mercapto-tetrahydrofuryl-3) (2'-methyl-2',5' dihydrofuryl-3') sulfide; 2',3-dimethyl-3',4-dioxa-2,8-dithiabicyclo-{3,3,0}octanspirocyclopentane; 2',4-dimethyl-3',5-dioxa-2,8-dithiabicyclo{3,3,0}-octan-spirocyclope (2,5-dimethyl-3-mercaptotetrahydrofuryl-3) (2,5'-methyl4',5'-dihydrofuryl-3') sulfide; (2,5-dimethyl-3-mercapto-tetrahydrofuryl-3) (2', 5'-dimethyl-2,5'-dihydrofuryl-3') sulfide; 2',4,3,5-tetramethyl-3',4-dioxa-2,8-dithiabicyclo{3,3,0}octanspirocyclopentane; 2',4,4,6-tetramethyl-3',5-dioxa-2,8-dithiabicyclo{3,3,0}octanspirocyclopentane; (2-methyl-3-mercapto-tetrahydrothienyl-3) (2'-methyl-4',5'-dihydrothienyl-3') sulfide; (2-methyl-3-mercapto-tetrahydrothienyl-3) (2'-methyl-2,5-dihydrothienyl-3') sulfide; 2-methyl-2,3',4,8-tetrathiablcyclo{3,3,0}octanspirocyclopentane; and 2',4-dimethyl-2,3,5,8-tetrathiabicycle{3,3,0}octanspirocyclopentane.

U.S. Pat. No. 3,917,869 (Evers et al. '869) discloses a process for altering the organoleptic properties of a foodstuff which comprises adding to the foodstuff a substituted 3-furyl thioester compound to impart to the foodstuff a meaty aroma and taste. The substituted 3-furyl thioester is selected from the group consisting of 2,5-dimethyl-3-thio(2-ethylbutyryl)furan, 2-methyl-3-thio(2-ethylbutyryl)furan, and 2,5-dimethyl-3-thio(2-methylbutyryl)furan.

U.S. Pat. No. 3,982,038 (Evers et al. '038) discloses a food flavor composition useful for augmenting the meaty or nutty flavor of a foodstuff comprising a 3-furyl β-chalcogenalkyl sulfide. Preferred 3-furyl β-chalcogenalkyl sulfides include (2,5-dimethyl-3-furyl) (2-mercapto-1-methyl propyl); (2,5-dimethyl-3-furyl) (2-hydroxy-1-methyl propyl); (2-mercapto 1-methyl propyl) (2-methyl-3-propyl) sulfide; (2-hydroxy-methyl propyl) (2-methyl-3-furyl) sulfide; trans-(2-hydroxy cyclohexyl) (2-methyl-3-furyl) sulfide; and trans-(2,5-dimethyl-3-furyl) (2-hydroxy cyclohexyl) sulfide.

U.S. Pat. No. 3,985,907 (Evers et al. '907) discloses substituted 3-furyl beta-oxoalkyl sulfides. Preferred 3-furyl beta-oxoalkyl sulfides include (1,3-diethylacetonyl (2-methyl-3-furyl) sulfide; (2-methyl-3-furyl) (3,3,3-trimethyl acetonyl) sulfide; (2-methyl-3-furyl) (1-methyl-2-oxopropyl disulfide; (3-methyl-3-furyl) (1-methyl-2-oxopropyl sulfide; (1,3-diethylacetonyl) (2,5-dimethyl-3-furyl) sulfide; (camphor-3-yl) (2-methyl-3-furyl sulfide; and (2-methyl-3-furyl) (1,1,3,3-tetramethylacetonyl sulfide.

U.S. Pat. No. 3,985,908 (Evers et al. '908) discloses substituted 3-furyl (2-pyridylmethyl) sulfides.

U.S. Pat. No. 3,993,792 (Winter et al. '792) discloses a process for altering the natural flavor of soluble coffee which comprises adding a 2-substituted furfuryl compound. The 2-substitutent may be —$(CH_2)_nSCOR$, wherein R is hydrogen, methyl, ethyl, propyl, butenyl, or propenyl and n is 1 or 2; or —$(CH_2)_nSR_2$, wherein $R_2$ is methyl, propyl, isopropyl, or furfuryl and n is 0, 1, or 2; or —$COSCH_3$. Preferred compounds include furfurylthiol acetate, furfurylthiol propionate, furfurylthiol butyrate, furfurylthiol β, β-dimethylacrylate, furfurylthiol tiglate, furfurylthiol formate, 5-methylfurfuryl methyl sulfide, furfuryl 5-methylfuryl sulfide, furfuryl isopropyl sulfide, 5-methylfuryl methyl sulfide, methylthiol furoate, furfuryl propyl sulfide.

U.S. Pat. No. 4,000,328 (Winter et al. '328) discloses a soluble coffee material having a 2-substituted thiophene compound. The 2-substitutent is —$(CH_2)_nCOR_2$, wherein $R_2$ is methyl, ethyl, or propyl. Preferred compounds include 2-acetylthiophene, 3-methyl-2-acetylthiophene, 4-methyl-2-acetylthiophene, 3-methyl-2-propionylthiophene, 5-methyl-2-propionylthiophene, 2-butyrylthiophene, 5-methyl-2-acetylthiophene, 2-propionylthiophene, 2-acetylmethylthiophene, and 5,5'-diacetyldithienyl-2,2'-methane.

U.S. Pat. No. 4,007,287 (Evers et al. '287) discloses a process for enhancing the flavor of a foodstuff comprising adding a 3-furfuryl sulfide compound. The 3-substitutent is a —$SR_1$ group wherein in $R_1$ is allyl. Illustrative examples include (allyl) (2-methyl-3-furyl) sulfide; (2-methyl-2-propenyl) (2-methyl-3-furyl) sulfide; (2-methyl-3-furyl) (methylthiomethyl) sulfide; (benzyl) (2-methyl-3-furyl) sulfide; and (2-butenyl) (2-methyl-3-furyl) sulfide.

U.S. Pat. No. 4,105,661 (Winter et al. '661) discloses a 2-substituted pyrazine compound. The 2-substitutent is —$(CH_2)_n$—$SR_1$ wherein n is 0, 1 or 2, $R_1$ is hydrogen, methyl, ethyl, acetyl, or furfuryl. Illustrative examples include (2-methylpyrazinyl-3, -5 and -6) furfuryl sulfides; pyrazinylmethyl mercaptan; pyrazinylmethyl methyl sulfide; pyrazinylmethyl ethyl sulfide; pyrazinylmethyl furfuryl sulfide; pyrazinylmethylthiol acetate; 2-pyrazinyl-ethyl mercaptan; 2-pyrazinyl-ethyl methyl sulfide; 2-pyrazinyl-ethyl ethyl sulfide; 2-pyrazinyl-ethyl furfuryl sulfide, and 2-pyrazinyl-ethylthiol acetate.

U.S. Pat. No. 4,514,429 (Pittet et al.) discloses a process for augmenting the aroma or taste of a foodstuff comprising adding to the foodstuff a 2-substituted furfural compound. The 2-substituents are dipropyl mercaptal and substituted 1,3-dithiolanes.

While the above disclosures provide some insight into the flavoring components in cooked beef and onions, the above disclosures do not provide satisfactory cooked beef and onions flavoring agents. The present invention provides a novel flavoring agent without the disadvantages which are characteristic of previously known products. The present invention also provides methods for preparing and using the flavoring agents and the ingestible compositions in which it may be employed.

SUMMARY OF THE INVENTION

The present invention is directed at a method for flavoring an ingestible composition which comprises admixing an ingestible vehicle with an organoleptically effective amount of furfuryl propyl disulfide represented by the formula, 2-Furan-$CH_2SSCH_2CH_2CH_3$, in purified form, unaccompanied by substances of natural origin present in cooked beef and onions.

The present invention is also directed at an ingestible composition comprising (i) an ingestible vehicle; and (ii) an organoleptically effective amount of furfuryl propyl disulfide represented by the formula, 2-Furan-$CH_2SSCH_2CH_2CH_3$, in purified form, unaccompanied by substances of natural origin present in cooked beef and onions.

The present invention is further directed at furfuryl propyl disulfide represented by the formula, 2-Furan-$CH_2SSCH_2CH_2CH_3$, in purified form, unaccompanied by substances of natural origin present in cooked beef and onions.

The present invention is still further directed at a method for preparing furfuryl propyl disulfide represented by the formula, (2-Furan-$CH_2SSCH_2CH_2CH_3$), which comprises reacting sodium furfurylthiolate with sodium propylthiosulfate to yield furfuryl propyl disulfide.

DETAILED DESCRIPTION OF THE INVENTION

Applicant has discovered that furfuryl propyl disulfide, 2-Furan-$CH_2SSCH_2CH_2CH_3$, possesses unexpected flavor properties and imparts a unique note to flavors, especially for conferring in foodstuffs in which it is incorporated a roasted, sulfidic, alliaceous, coffee, meaty, chicken, metallic, burnt, onion-leek like, coffee like, pungent, rubbery, sulfurous, cooked, sharp, garlic flavor. A relatively large number of components (231) were identified in an analysis of cooked beef and onions flavor. The compounds were tentatively identified by interpretation of their mass spectra and gas chromatographic data (two phases) and confirmed by synthesis and analysis (IR, NMR and mass spectra). A sample of furfuryl propyl disulfide was synthesized and confirmed as being authentic by NMR and IR spectroscopy. The organoleptic properties of furfuryl propyl disulfide were examined to establish its use as a flavoring material. It was found that furfuryl propyl disulfide has very good organoleptic properties, indeed better than many actual cooked beef and onions components. For this reason it was decided to explore further the use of furfuryl propyl disulfide. Furfuryl propyl disulfide was found to possess unique flavor characteristics and has been successfully incorporated into commercially viable flavors.

Industry continually seeks methods to upgrade natural products by altering or enhancing the taste qualities of less desirable, but usually more abundant, natural products. By using specifically designed flavoring agents, undesirable flavor notes can often be eliminated or masked with a desirable one. Accordingly, the flavor agent of the present invention may be employed to alter or enhance foods or food products such as liquid foods or beverages, fruit and vegetable juices, milk, coffee, tea, cocoa, chocolate, and the like, or solid foods such as cereals, flours, confections, vegetables, meats, etc. The flavor agent may be used either in liquid or solid form and in quantities designed to give the desired results.

The following terms are used throughout the specification and are defined as follows unless otherwise indicated.

The terms "ingestible" and "edible", as used herein, refer to all materials and compositions which are used by or which perform a function in the body. These materials and compositions include those which are adsorbed and those which are not absorbed as well as those which are digestible and non-digestible.

The terms "flavor", "flavoring", and "flavorant", as used herein, are used interchangeably whenever an organoleptic compound is referred to which is intended to stimulate the sense of taste and smell.

The term "organoleptic", as used herein, refers to compounds of the invention which stimulate the sense of smell or taste, and are thus perceived as having a characteristic odor and/or flavor. The term "organoleptically acceptable solvent", as used herein, refers to solvents which do not stimulate the sense of smell or taste, and are thus perceived as not having a characteristic odor and/or flavor. The term "organoleptically effective amount", as used herein, means a level or amount of flavoring compound(s) present in a material at which the incorporated compound(s) exhibit(s) a sensory effect.

The terms "alter", "modify", and "augment", as used herein, in their various forms mean supplying or imparting flavor character or note to otherwise bland, relatively tasteless substances or augmenting the existing flavor characteristic where a natural flavor is deficient in some regard or supplementing the existing flavor impression to modify its quality, character or taste.

The term "enhance", as used herein, means the intensification of a flavor or aroma characteristic or note without the modification of the quality thereof. Thus, "enhancement" of a flavor or aroma means that the enhancement agent does not add any additional flavor note.

The term "foodstuff", as used herein, refers to both solid and liquid ingestible materials which usually do, but need not, have nutritional value. Thus, foodstuffs include soups, convenience foods, beverages, dairy products, candies, vegetables, cereals, soft drinks, snacks, and the like.

In accordance with the present invention, applicant has discovered a method for flavoring an ingestible composition. The method comprises admixing an ingestible vehicle with an organoleptically effective amount of furfuryl propyl disulfide represented by the formula, 2-Furan-CH$_2$SSCH$_2$CH$_2$CH$_3$, in purified form, unaccompanied by substances of natural origin present in cooked beef and onions.

As set out above, furfuryl propyl disulfide was synthesized and its organoleptic properties were examined to establish its use as a flavoring material. Furfuryl propyl disulfide has the structure set out below.

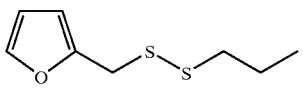

Furfuryl propyl disulfide was prepared by a Bunte salt reaction. Sodium furfurylthiolate was prepared by reaction of furfuryl mercaptan with sodium hydroxide in water. Sodium propylthiosulfate (Bunte salt) was prepared by reaction of bromopropane with sodium thiosulfate in a mixture of methanol/water. The reaction of the two salts, sodium furfurylthiolate and sodium propylthiosulfate, in water yielded furfuryl propyl disulfide.

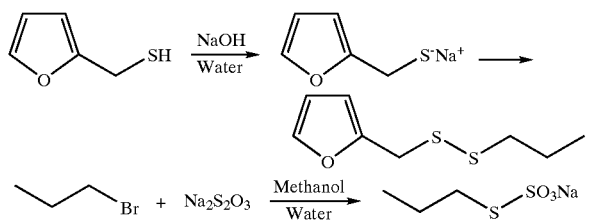

Distillation of the crude material at 102° C. under 2 mm Hg gave furfuryl propyl disulfide in 84% yield and 98% purity.

Furfuryl propyl disulfide is of use in the formulation of flavoring compositions, especially for conferring in foodstuffs in which it is incorporated a roasted, sulfidic, alliaceous, coffee, meaty, chicken, metallic, burnt, onion-leek like, coffee like, pungent, rubbery, sulfurous, cooked, sharp, garlic flavor. Illustrative foodstuffs include spice and seasonings, snack foods, baked goods, cheese, egg products, gravies, soups, and meats including poultry, fish, and pork.

The flavoring agent of the present invention may be used in many distinct physical forms well known in the flavoring art to provide an initial dosage of the flavoring agent and/or a further time-release form of the flavoring agent. Without being limited thereto, such physical forms include free forms and encapsulated forms, and mixtures thereof.

The flavoring agent may be used in a wide variety of ingestible vehicles. The combination of the flavoring agent of the present invention together with an ingestible vehicle and optional ingredients, when desired, provides a flavoring agent that possesses unexpected flavor value and imparts a unique note to a wide variety of flavors, especially cooked beef and onions flavor. Nonlimiting examples of suitable ingestible vehicles include meat products, dairy products, beverage products, and the like. The flavoring agent may be used to augment or enhance the aroma or taste of roasted nut, roasted meat, beef broth, black pepper, onion, fine herbs, and omelet foodstuffs. The flavoring agent may also be used to augment or enhance the aroma or taste of liquid foods or beverages, fruit and vegetable juices, milk, coffee, tea, cocoa, chocolate, and the like, or solid foods such as cereals, flours, confections, vegetables, meats. Preferably, the ingestible vehicle is a meat product.

The amount of the inventive flavoring agent employed in an ingestible composition is an organoleptically effective amount to provide a flavoring agent that exhibits a sensory effect. The amount of flavoring agent of the present invention employed in a particular instance can vary over a relatively wide range, depending upon the desired organoleptic effects to be achieved. Thus, correspondingly greater amounts would be necessary in those instances wherein the ultimate food composition to be flavored is relatively bland to the taste, whereas relatively minor quantities may suffice for purposes of enhancing the composition merely deficient in natural flavor or aroma. The primary requirement is that the amount selected is effective, i.e., sufficient to alter, modify, or enhance the organoleptic characteristics of the parent composition. The exact amount of flavoring agent used may vary depending upon the type of flavoring agent employed, the type of ingestible vehicle employed, and the level of flavor desired. In general, the amount of flavoring agent present is the ordinary dosage required to obtain the desired result. Such dosages are known to the skilled practitioner in the confectionery arts and are not a part of the present invention. In a preferred embodiment, the flavoring agent in the flavoring agent is present in an amount from about 0.001 ppm to about 1000 ppm, preferably from about 0.01 ppm to about 500 ppm, and more preferably from about 0.01 ppm to about 100 ppm, by weight.

In the method for flavoring an ingestible composition of the present invention, the ingestible composition is prepared by admixing the flavoring agent in an ingestible vehicle, together with any optional ingredients, to form a uniform mixture. The final compositions are readily prepared using standard methods and apparatus generally known by those skilled in the confectionery arts. The apparatus useful in accordance with the present invention comprises mixing apparatus well known in the confectionery arts, and therefore the selection of the specific apparatus will be apparent to the artisan.

In another embodiment, the invention is directed at an ingestible composition comprising (i) an ingestible vehicle; and (ii) an organoleptically effective amount of furfuryl propyl disulfide represented by the formula, (2-Furan-CH$_2$SSCH$_2$CH$_2$CH$_3$), in purified form, unaccompanied by substances of natural origin present in cooked beef and onions.

In still another embodiment, the present invention is directed at furfuryl propyl disulfide represented by the formula, (2-Furan-CH$_2$SSCH$_2$CH$_2$CH$_3$), in purified form, unaccompanied by substances of natural origin present in cooked beef and onions.

The flavoring agent may further comprise an organoleptically acceptable solvent. The organoleptically acceptable solvent may be any solvent which does not interfere with the organoleptic properties of the flavoring agents of the present invention. In general, the organoleptically acceptable solvent does not stimulate the sense of smell or taste, and is not perceived as having a characteristic odor and/or flavor. Illustrative nonlimiting examples of organoleptically acceptable solvents may be selected from the group consisting of propylene glycol, ethanol, triacetin, glycerol, and vegetable oils. When employed, the organoleptically acceptable solvent will be present in an amount from about 1% to about 99%, preferably from about 5% to about 90%, and more preferably from about 20% to about 80%, by weight.

Other substances suitable for use as co-ingredients or flavoring adjuvants are well known in the art for such use and have been extensively described in the relevant literature. Any such co-ingredient must be ingestible and thus non-toxic and must also be non-deleterious from an organoleptic standpoint whereby the ultimate flavor and/or aroma of the consumable material used is not caused to have unacceptable aroma or taste. Such materials may in general be characterized as flavoring adjuvants or vehicles comprising broadly stabilizers, thickeners, surface active agents, conditioners, other flavorants, and flavor intensifiers.

Stabilizer compounds include preservatives, e.g. sodium chloride; antioxidants, e.g. calcium and sodium ascorbate, ascorbic acid, butylated hydroxy-anisole (mixture of 2- and 3-tertiary-butyl-4-hydroxy-anisole), butylated hydroxy toluene (2,6-di-tertiary-butyl-4-methyl phenol), propyl gallate, and the like, and sequestrants, e.g. citric acid.

Thickener compounds include carriers, binders, protective colloids, suspending agents, emulsifiers and the like, e.g. agar agar, carrageenan; cellulose and cellulose derivatives such as carboxymethyl cellulose and methyl cellulose; natural and synthetic gums such as gum arable, gum tragacanth; gelatin, proteinaceous materials; lipids; carbohydrates; starches, pectins and emulsifiers, e.g. mono- and diglycerides of fatty acids, skim mild powder, hexoses, pentoses, disaccharides, e.g. sucrose, corn syrup and the like.

Surface active agents include emulsifying agents, e.g. fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol, and the like.

Conditioners include compounds such as bleaching and maturing agents, e.g. benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g. sodium acetate, ammonium bicarbonate, ammonium phosphate, citric acid, lactic acid, vinegar and the like; colorants, e.g. carminic acid, cochineal, tumeric and curcuma and the like; firming agents such as aluminum sodium sulfate, calcium chloride and calcium gluconate; texturizers, anti-caking agents, e.g. aluminum calcium sulfate and tribasic calcium phosphate, enzymes; yeast foods, e.g. calcium lactate and calcium sulfate; nutrient supplements, e.g. iron salts such as ferric phosphate, ferrous gluconate and the like, riboflavin, vitamins, zinc sources such as zinc chloride, zinc sulfate, and the like.

Other flavorants and flavor intensifiers include organic acids, e.g. acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid, and 2-methyl-3-pentenoic acid; ketones and aldehydes, e.g. acetaldehyde, acetophenone, acetone, acetyl methyl carbinol, acrolein, n-butanal, crotonal, diacetyl, 2-methyl butanal, beta,beta-dimethylacrolein, methyl-n-amyl ketone, n-hexenal, 2-hexenal, isopentanal, hydrocinnamic aldehyde, cis-3-hexenal, 2-heptanal, nonyl aldehyde, 4-(p-hydroxyphenyl)-2-butanone, alpha-ionone, beta-ionone, methyl-3-butanone, benzaldehyde, damascone, damascenone, acetophenone, 2-heptanone, o-hydroxyacetophenone, 2-methyl-2-hepten-6-one, 2-octanone, 2-undecanone, 3-phenyl-4-pentenal, 2-phenyl-2-hexenal, 2-phenyl-2-pentenal, furfural, 5-methyl furfural, cinnamaldehyde, beta-cyclohomocitral, 2-pentanone, 2-pentenal and propanal; alcohols such as 1-butanol, benzyl alcohol, 1-borneol, trans-2-buten-1-ol, ethanol, geraniol, 1-hexanal, 2-heptanol, trans-2-hexenol-1, cis-3-hexen-1-ol, 3-methyl-3-buten-1-ol, 1-pentanol, 1-penten-3-ol, p-hydroxyphenyl-2-ethanol, isoamyl alcohol, isofenchyl alcohol, phenyl-2-ethanol, alpha-terpineol, cis-terpineol hydrate, eugenol, linalool, 2-heptanol, acetoin; esters such as butyl acetate, ethyl acetate, ethyl acetoacetate, ethyl benzoate, ethyl butyrate, ethyl caprate, ethyl caproate, ethyl caprylate, ethyl cinnamate, ethyl crotonate, ethyl formate, ethyl isobutyrate, ethyl isovalerate, ethyl laurate, ethyl myristate, ethyl alpha-methyl-butyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, alpha-methylphenylglycidate, ethyl succinate, isobutyl cinnamate, cinnamyl formate, methyl cinnamate and terpenyl acetate; hydrocarbons such as dimethyl naphthalene, dodecane, methyl diphenyl, methyl naphthalene, myrcene, naphthalene, octadecane, tetradecane, tetramethyl naphthalene, tridecane, trimethyl naphthalene, undecane, caryophyllene, 1-phellandrene, p-cymeme, 1-alpha-pinene, beta-pinene, dihydrocarveol; pyrazines such as 2,3-dimethylpryazine, 2,5-dimethylpyrazine, 2,6-dimethylpyrazine, 3-ethyl-2,5-dimethylpyrazine, 2-ethyl-3,5,6-trimethylpyrazine, 3-isoamyl-2,5-dimethylpyrazine, 5-isoamyl-2,3-dimethylpyrazine, 2-isoamyl-3,5,6-trimethylpyrazine, isopropyl dimethyl-pyrazine, methyl ethylpyrazine, tetramethylpyrazine, trimethyl-pyrazine; essential oils such as jasmine absolute, cassia oil, cinnamon bark oil, black pepper oleoresin, oil of black pepper, rose absolute, orris absolute, oil of cubeb, oil of coriander, oil of pimento leaf, oil of patchouli, oil of nutmeg, lemon essential oil, safran oil, Bulgarian rose oil, capsicum, yara yara and vanilla; lactones such as gamma-nonalactone; sulfides, e.g. allyl propenyl disulfide, dipropyl disulfide, dipropyl trisulfide, diallyl disulfide, diallyl trisulfide, 2-methyl-3-furyl methyl sulfide and bis(2-methyl-3-furyl) disulfide and other materials such as maltol, acetoin, acetals (e.g. 1,1-diethoxyethane, 1,1-dimethoxyethane, dimethoxymethane, 1-acetoxy-1-ethoxyethane and 1-acetoxy-1-methoxyethane), piperine, chavicine, piperidine, 2,5-dimethyl-3-acetyl furan, and 2,5-dimethyl-3-acetyl thiophene.

The specific flavor adjuvants selected for use may be either solid or liquid depending upon the desired physical form of the ultimate foodstuff, and whether simulated or natural, and should (i) be organoleptically compatible with the furfuryl propyl disulfide of the present invention by not covering or spoiling the organoleptic properties (aroma or taste) of the agent; (ii) be nonreactive with the furfuryl propyl disulfide of the present invention; and (iii) be capable of providing an environment in which the furfuryl propyl disulfide of the present invention can be dispersed or admixed to provide a homogeneous medium. In addition, selection of one or more flavoring adjuvants, as well as the quantities will depend upon the precise organoleptic character desired in the finished product. Thus, in the case of flavoring compositions, ingredient selection will vary in accordance with the foodstuff to which the flavor and/or aroma are to be imparted, modified, altered or enhanced. In contrast, in the preparation of solid products, e.g. simulated foodstuffs, ingredients capable of providing normally solid compositions should be selected such as various cellulose derivatives.

The compositions described herein can be prepared according to conventional techniques well known as typified by meat pie crust batters and proteinaceous drinks and can be formulated by admixing the involved ingredients within the proportions stated in a suitable blender to obtain the desired consistency and homogeneity of dispersion. Alternatively, flavoring compositions in the form of particulate solids can be conveniently prepared by mixing the flavoring agents with, for example, gum arabic, gum tragacanth, carrageenan, and the like, and thereafter spray-drying the resultant mixture to obtain the particulate solid product. Pre-prepared flavor mixes in powder form, e.g. onion-flavored powder mix, are obtained by mixing the dried solid components, e.g. starch, sugar and the like, and the flavoring agent of the present invention in a dry blender until the requisite degree of uniformity is achieved.

Throughout this application, various publications have been referenced. The disclosures in these publications are incorporated herein by reference in order to more fully describe the state of the art.

The present invention is further illustrated by the following examples which are not intended to limit the effective scope of the claims. All parts and percentages in the examples and throughout the specification and claims are by weight of the final composition unless otherwise specified.

EXAMPLE 1

This example illustrates the preparation of furfuryl propyl disulfide represented by the formula, 2-Furan-$CH_2SSCH_2CH_2CH_3$, in purified form, unaccompanied by substances of natural origin present in cooked beef and onions.

Identification of Furfuryl Propyl Disulfide ($C_8H_{12}OS_2$) in Cooked Beef and Onions As part of the Generessence program, natural products are analyzed to characterize the volatile compound profile in the interest of developing better flavors and fragrances. The flavors and fragrances developed from these analyses are made using only compounds found in the natural product. The identification of novel, natural chemicals is also a goal of the program. Beef and onions were cooked together and analyzed as part of this program. Furfuryl propyl disulfide was identified in this analysis and subsequently synthesized for confirmation and evaluation. This compound has not, to the best of our knowledge, been previously reported in nature. This analysis proves the existence of furfuryl propyl disulfide in a natural product, warranting a change in its status to nature identical.

Experimental

Sample Preparation

A quantity of 750 g of cubed beef was browned on all sides, mixed with lightly sauteed onions, covered with water and simmered (covered) for approximately three hours.

Headspace

The headspace was collected onto a single Tenax trap (75 cc/min) from the pot during the last seven minutes of the cooking time. A small condensate trap in a room temperature water bath was utilized to reduce the moisture level of the headspace reaching the Tenax traps. The Tenax trap was thermally desorbed using a Perkin Elmer ATD400 thermal desorber in combination with GC/MS analysis. Detection and quantification of the headspace analysis were performed using the Micromass Prospec on an SGE BPX5 GC column phase without any correction for response factors.

Distillation

The resulting cooked product mixture (~500 ml) was pureed in a food processor with an additional 500 ml of water and extracted by Likens-Nickerson simultaneous distillation/extraction techniques. A J&W apparatus was used with a 1:1 pentane-ether solvent mixture. The distillate solution was dried over sodium sulfate and concentrated to approximately 1 ml by evaporation under Helium.

Equipment and Conditions

Gas Chromatography

The extract was analyzed on a HP 6890 GC with split/splitless injection and a Flame Ionization Detector (FID). 1 uL of the extract was injected onto a SGE BPX-5 chromatographic column (50m×0.22 mm ID×0.25, um film thickness) in the split mode (40:1 split ratio) with the injection temperature at 250° C. The GC oven was temperature programmed from an initial temperature of 40° C., programming at 3° C./min to a final temperature of 350° C. The detector temperature was 250° C. The GC data was collected and stored on a Turbochrom work station.

The extract was also injected onto an HP 6890 GC fitted with a SGE BP 21 chromatographic column (50 m×0.22 mm ID×0.25 p film thickness) using the same injection techniques combined with an HP 5973 MSD (mass spectrometer) for detection and identification. The GC oven was temperature programmed from an initial temperature of 40° C., programming at 3° C./min to a final temperature of 240° C. held for 20 minutes.

Mass Spectrometry

Identification of components in the extract was done by mass spectrometry. For analysis on the BPX-5 phase, the sample was introduced via a Hewlett Packard 5890 GC into a Micromass Prospec magnetic sector mass spectrometer. GC oven conditions were the same as the conditions outlined above. The mass spectrometer was operated in EI mode scanning from m/z 430 to m/z 33 (@1 second per decade). The data was analyzed on the OPUS data system using a Bush Boake Allen in-house library along with the commercial NIST library. For analysis of the extract on the BP 21 phase, mass spectroscopy was done on a HP 5973 MSD mass spectrometer. The instrument was operated in the EI mode scanning from m/z 25 to m/z 350@0.5 seconds per scan. Data was analyzed on the MSD system using the Bush Boake Allen in-house library and the commercial Wiley6 and NIST libraries.

Mass Spectra

The mass spectra were consistent between the analyses showing slight intensity differences with ions (headspace analysis spectrum) at m/z 188M+(4), 81 (100), 53(14), 82(5).

Retention Indices

The retention index of the furfuryl propyl disulfide was determined by interpolation between the retention times of n-alkyl ethyl esters. The retention index of the target compound was measured at 1004 on the BPX5 column in both the headspace and distillate analyses. The distillate was also analyzed on a BP21 column for which the retention index was estimated at 1300

Furfuryl Propyl Disulfide Synthesis

Furfuryl propyl disulfide was synthesized and its organoleptic properties were examined to establish its use as a flavoring material. Furfuryl propyl disulfide has the structure set out below.

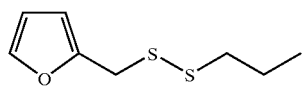

Furfuryl propyl disulfide was prepared by a Bunte salt reaction. Sodium furfurylthiolate was prepared by reaction of furfuryl mercaptan with sodium hydroxide in water. Sodium propylthiosulfate (Bunte salt) was prepared by reaction of bromopropane with sodium thiosulfate in a mixture of methanol/water. The reaction of the two salts, sodium furfurylthiolate and sodium propylthiosulfate, in water yielded furfuryl propyl disulfide.

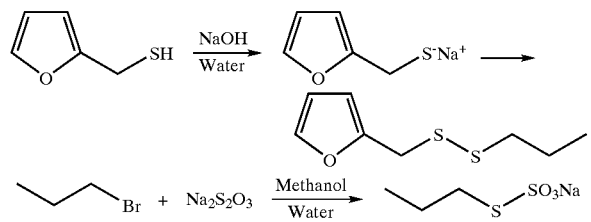

Distillation of the crude material at 102° C. under 2 mm Hg gave furfuryl propyl disulfide in 84% yield and 98% purity. The identity and purity of furfuryl propyl disulfide was confirmed by GC, IR, and NMR analysis.

EXAMPLE 2

Flavor Ingredient Evaluation Results

This example summarizes the flavor evaluation results obtained comparing the novel flavoring agent of the present invention versus control compounds.

Beef Flavoring

A bouillon soup (vegetable base) with 0.10% w/w added beef flavoring was prepared and used as a control. Furfuryl propyl disulfide was then added to the control at the following levels.

A) 0 PPM, control
1) 0.2 PPM
2) 0.5 PPM

All the flavoring compositions were evaluated in the bouillon and a blind comparison was carried out with each of the above flavoring compositions. The opinion of the panel of flavorists who carried out the evaluations was as follows:

Sample (A) Fatty, meaty
Sample (1) Fatty, onion-like, more meaty impact
Sample (2) Fatty, onion-like, juicy meaty, authentic These results show that furfuryl propyl disulfide alters the flavor composition and at the levels of 0.2 PPM–0.5 PPM in the bouillon soup imparts a more characteristic beef character. The most preferred flavoring sample was Sample (2) that contained 0.5 PPM of Furfuryl propyl disulfide. This was determined to be more characteristic than the other samples.

In summary, the panel results show that the odor and taste characteristics of the furfuryl propyl disulfide flavor chemical of the present invention has a beneficial effect on the overall profile of beef flavorings.

The invention being thus described, it will be obvious that the same may be varied in many ways. Such variations are not to be regarded as a departure from the spirit and scope of the invention and all such modifications are intended to be included within the scope of the following claims.

We claim:

1. A method for flavoring an ingestible composition which comprises admixing an ingestible vehicle with an organoleptically effective amount of furfuryl propyl disulfide represented by the formula, (2-Furan-CH$_2$SSCH$_2$CH$_2$CH$_3$), in purified form, unaccompanied by substances of natural origin present in cooked beef and onions.

2. The method according to claim 1, wherein furfuryl propyl disulfide is present in the ingestible composition in an amount from about 0.001 ppm to about 1000 ppm, by weight.

3. The method according to claim 2, wherein furfuryl propyl disulfide is present in the ingestible composition in an amount from about 0.01 ppm to about 500 ppm, by weight.

4. The method according to claim 1, wherein the ingestible vehicle is selected from the group consisting of meat products, dairy products, and beverage products.

5. The method according to claim 4, wherein the ingestible vehicle is a meat product.

6. An ingestible composition comprising:

(i) an ingestible vehicle; and
(ii) an organoleptically effective amount of furfuryl propyl disulfide represented by the formula, (2-Furan-CH$_2$SSCH$_2$CH$_2$CH$_3$), in purified form, unaccompanied by substances of natural origin present in cooked beef and onions.

7. The ingestible composition according to claim 6, wherein furfuryl propyl disulfide is present in the ingestible composition in an amount from about 0.001 ppm to about 1000 ppm, by weight.

8. The ingestible composition according to claim 7, wherein furfuryl propyl disulfide is present in the ingestible composition in an amount from about 0.01 ppm to about 500 ppm, by weight.

9. The ingestible composition according to claim 6, wherein the ingestible vehicle is selected from the group consisting of meat products, dairy products, and beverage products.

10. The ingestible composition according to claim 9, wherein the ingestible vehicle is a meat product.

11. Furfuryl propyl disulfide represented by the formula, (2-Furan-CH$_2$SSCH$_2$CH$_2$CH$_3$), in purified form, unaccompanied by substances of natural origin present in cooked beef and onions.

12. A method for preparing furfuryl propyl disulfide represented by the formula, (2-Furan-CH$_2$SSCH$_2$CH$_2$CH$_3$), which comprises reacting sodium furfurylthiolate with sodium propylthiosulfate to yield furfuryl propyl disulfide.

* * * * *